United States Patent [19]
Fujiki et al.

[11] Patent Number: 5,992,260
[45] Date of Patent: Nov. 30, 1999

[54] OPERATING DEVICE FOR A WORKING VEHICLE

[75] Inventors: Katsumi Fujiki; Takanobu Shimada; Shuichi Togami, all of Okayama, Japan

[73] Assignees: Yanmar Agricultural Equipment Co., Ltd., Osaka; Seirei Industry Co., Ltd., Okayama, both of Japan

[21] Appl. No.: 09/011,733

[22] PCT Filed: Aug. 5, 1996

[86] PCT No.: PCT/JP96/02210

§ 371 Date: Feb. 18, 1998

§ 102(e) Date: Feb. 18, 1998

[87] PCT Pub. No.: WO97/09870

PCT Pub. Date: Mar. 20, 1997

[30] Foreign Application Priority Data

Sep. 11, 1995 [JP] Japan .................................. 7-232420
Sep. 11, 1995 [JP] Japan .................................. 7-232421

[51] Int. Cl.[6] .............................. G05G 1/00; G05G 1/04; H01H 9/06; B66C 23/00
[52] U.S. Cl. .......................... 74/469; 74/523; 200/61.88; 414/680

[58] Field of Search ......................... 74/523, 491, 483 R, 74/469; 200/61.88; 414/680

[56] References Cited

FOREIGN PATENT DOCUMENTS 6451002   2/1989  Japan .
1256303  10/1989  Japan .
3224405  10/1991  Japan .

*Primary Examiner*—Tamara L. Graysay
*Assistant Examiner*—Colby Hansen
*Attorney, Agent, or Firm*—Jordan and Hamburg LLP

[57] ABSTRACT

One operating lever is provided for moving a traveling vehicle with a working machine back and forth and the working machine vertically and operating a sub-transmission. A sub-transmission switch is provided in a recessed portion formed in a grip of a back-and-forth operating lever so that a quick operation can be effected by a single hand without any mistake. In addition, the working machine vertically moving lever is constructed so as to interlock with a spool of a vertical motion control valve via a motor so that the speed of the motor is gradually reduced when the working machine vertically moving lever (32) is in a lowering operation, thereby preventing a drastic lowering.

9 Claims, 10 Drawing Sheets

OPERATING DEVICE FOR A WORKING VEHICLE

BACKGROUND OF THE INVENTION

The present invention relates to a technique enabling a working machine attached to the rear of a tractor to move vertically by one switching operation of a vertically moving lever provided on a back-and-forth operating lever disposed at an operating portion of the tractor, and providing the back-and-forth operating lever with a sub-transmission operating device.

Conventionally, a tractor is equipped at the rear thereof with a working machine via a working machine attaching device. The working machine can be moved vertically by lift arms of the working machine attaching device rotated by extension and contraction of a hydraulic cylinder which is operated by rotative operation of a position lever or a vertically moving switch disposed at a side of a seat so as to switch a control valve.

When reversing at an end of a line in a farm, the tractor, provided with the position lever or the vertically moving switch at a side of a seat thereof for moving the working machine vertically, must be stopped or decelerated. The working machine is lifted by operation of the position lever or the vertically moving switch, and then the tractor takes a U-turn slowly or travels backwardly by operation of a transmission, so that the tractor with the working machine works along the next line. Thus, the transmitting operation and the vertically moving operation of the working machine are done separately for the reversal, so as to take a long time. Furthermore, since a large tractor with a heavy working machine is constructed such that the working machine moves down by dead load, the working machine cuts into the field deeply at the initial time of working, so as to make the depth of cultivating unstable.

Also, a conventional technique of changing the traveling speed of a tractor equipped with a hydrostatic transmission (hereinafter "HST") by operation of a back-and-forth operating lever is known. Such a traveling vehicle is conventionally provided with a sub-transmission in addition to a main-transmission, thereby enabling the traveling speed thereof to be changed at a plurality of steps. A sub-transmission lever for operating the sub-transmission is provided apart from the back-and-forth operating lever for operating the main-transmission.

Thus, in such construction comprising the main-transmission of the HST and the sub-transmission of gearing, the back-and-forth operation lever and the sub-speed changing lever are separately provided. The sub-transmission of gearing occasionally requires declutching. If a handle is operated for steering and simultaneously main-and-sub-transmission levers are operated for the particular transmission at work, the speed of the vehicle cannot be changed smoothly. Also, when a step of traveling speed is shifted from a low speed position to a high speed position and is returned to the original low speed position, the original low speed can hardly be obtained, thereby requiring the further transmitting operation, which in turn prevents the field from being cultivated equally.

SUMMARY OF THE INVENTION

A back-and-forth operating lever is disposed near a seat of a traveling vehicle, the back-and-forth operation lever being provided, at a grip thereof, with a working machine vertically moving lever and a sub-transmission switch, so that operations of back-and-forth travel, of vertically moving a working machine, and of control of a sub-transmission can be done by a single hand. The sub-transmission switch is disposed so as not to project from the gripped surface of the grip, whereby operation of the sub-transmission in error is prevented.

Also, the working machine vertically moving lever is constructed so as to interlock with a spool of a vertical motion control valve via a motor so that the speed of the motor is gradually reduced when the working machine vertically moving lever is in a lowering operation, so that the working machine is prevented from a drastic lowering causing damage thereof. An operation of a position lever has priority over that of the working machine vertically moving lever, so that the working machine can be returned to the predetermined depth of cultivating easily.

DETAILED DESCRIPTION OF THE INVENTION

Figure 1:
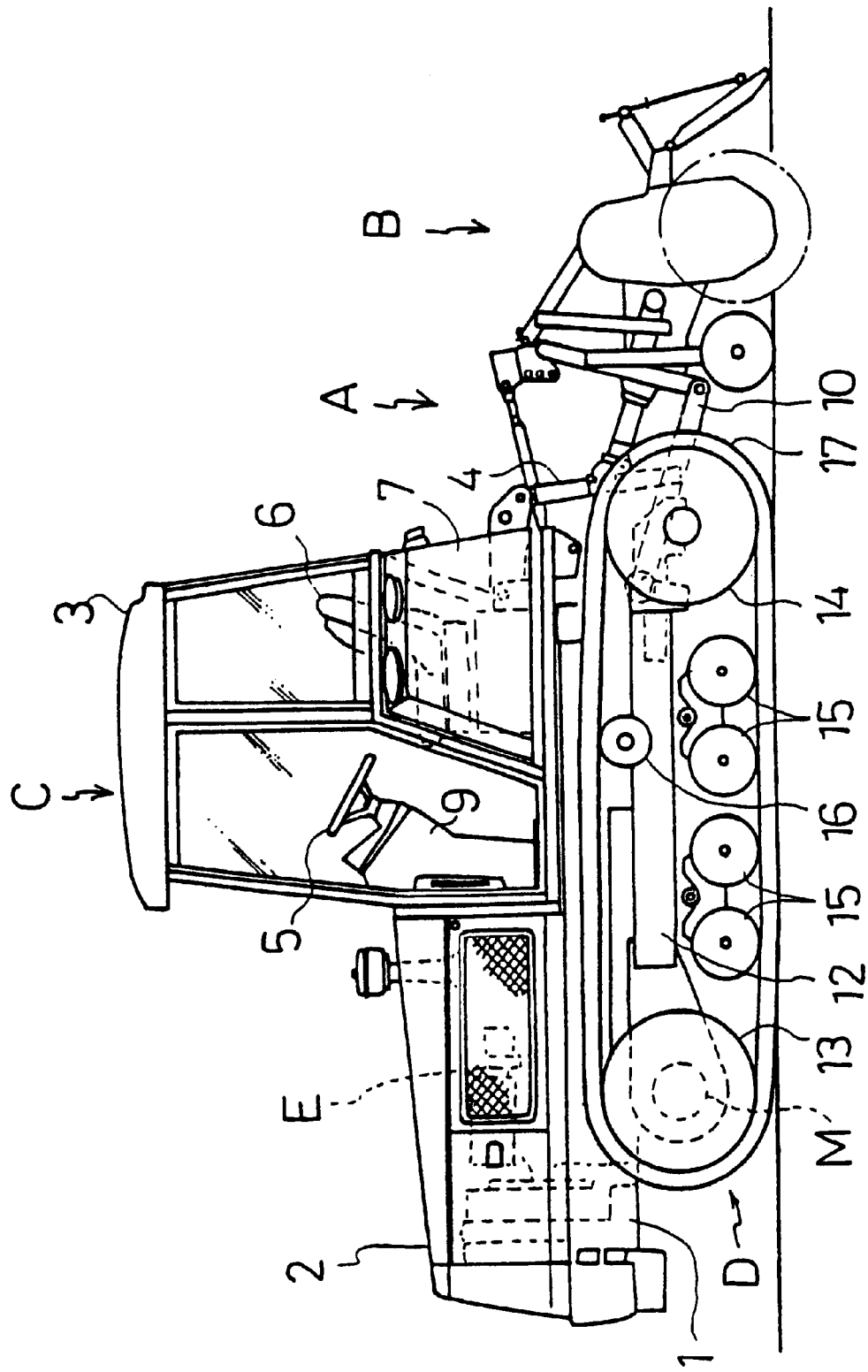
FIG. 1 is a side view of a whole tractor of crawler type.
Figure 2:
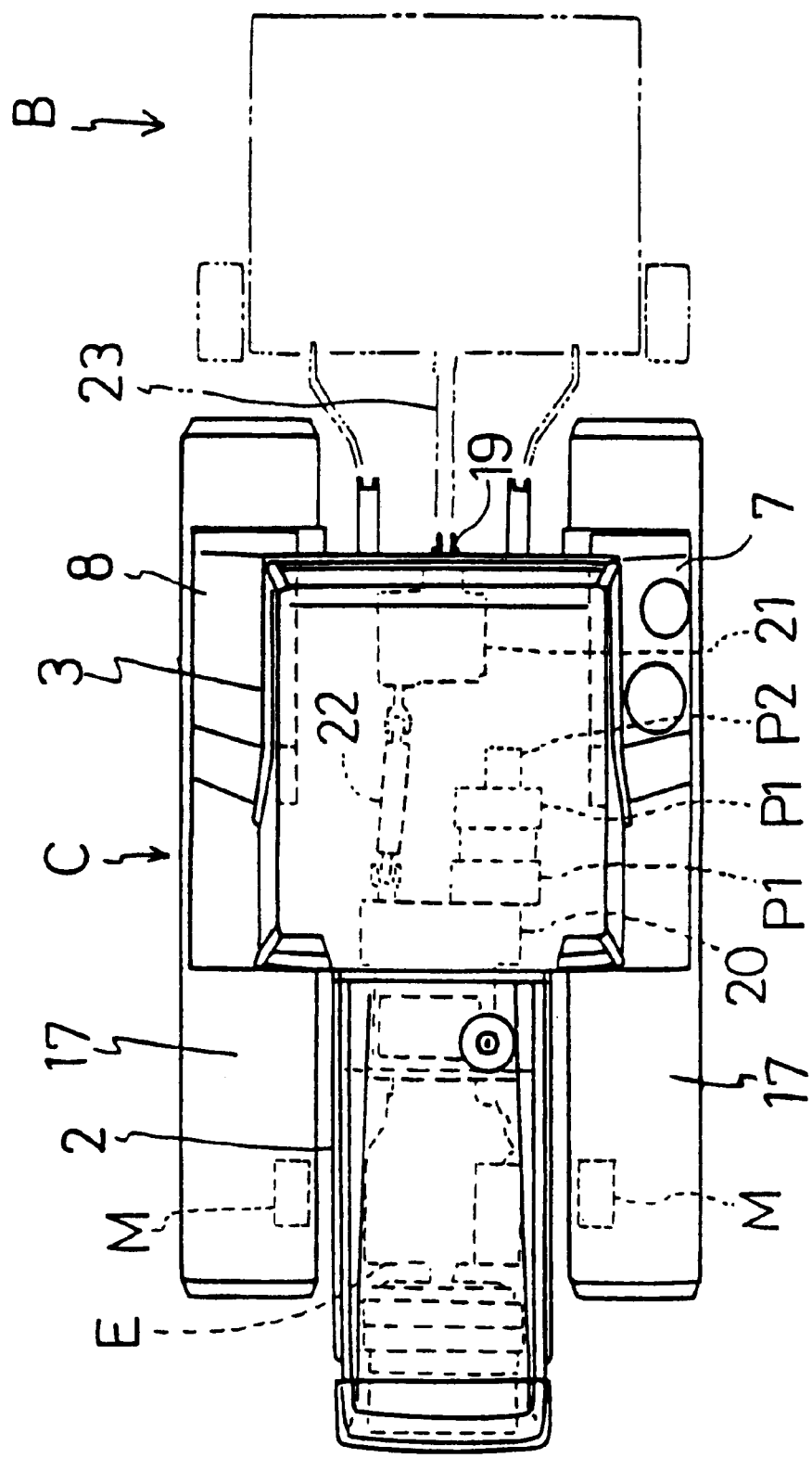
FIG. 2 is a plan view of the tractor of FIG. 1.

Explanation will be given on an entire construction according to FIGS. 1 and 2. A tractor of crawler type is provided with an engine E mounted on front portions of left and right body frames 1 thereof and included in a bonnet 2. A working machine attaching device A of three point links is disposed at the rear ends of body frames 1, and a working machine B is attached to the rear end of working machine attaching device A and can be moved vertically by a vertical motion means 4. In this embodiment, working machine B is a rotary cultivator, and vertical motion means 4 is a hydraulic cylinder.

Behind bonnet 2 is disposed a cabin 3. Cabin 3 is provided therein with a handle 5, a seat 6 and the like, so as to constitute an operating portion C. At both left and right sides of cabin 3 are disposed a fuel tank 7 and an operating oil tank 8. Below body frames 1 is disposed a crawler traveling device D.

Crawler traveling device D is so constructed that left and right traveling frame 12 are disposed below the tractor body. A pair of driving sprockets 13 driven respectively by a pair of hydraulic motors M are disposed respectively at the front ends of traveling frames 12 and a pair of follower sprockets 14 are disposed respectively at the rear ends thereof so as to give crawlers tension. Rolling wheels 15 are disposed under traveling frame 12 and a pair of rollers 16 are disposed respectively at the upper portions thereof, and each of a pair of crawlers 17 is wound around driving sprocket 13, follower sprocket 14, rolling wheels 15 and roller 16. Accordingly, left and right driving sprockets 13 are rotated by the pair of hydraulic motors M so as to make crawler traveling device D travel.

Onto the rear portion of engine E is fixed a front transmission case 20 through a clutch case. A pair of hydraulic pumps P1 and a hydraulic pump P2 for working machine B are arranged in a row at the rear portion of front transmission case 20. The pair of hydraulic pumps P1 are connected respectively with left and right hydraulic motors M via piping, so that pressure oil is discharged from hydraulic pumps P1 to hydraulic motors M, thereby driving hydraulic motors M. At the rear portion of body frame 1 is disposed a rear transmission case 21, so that driving power is transmitted from front transmission case 20 to rear transmission case 21 via a universal joint 22. A PTO shaft 19 projects backwardly from the rear surface of rear transmission case 21. A working machine B receives power from PTO shaft 19 via a universal joint 23.

Figure 3:
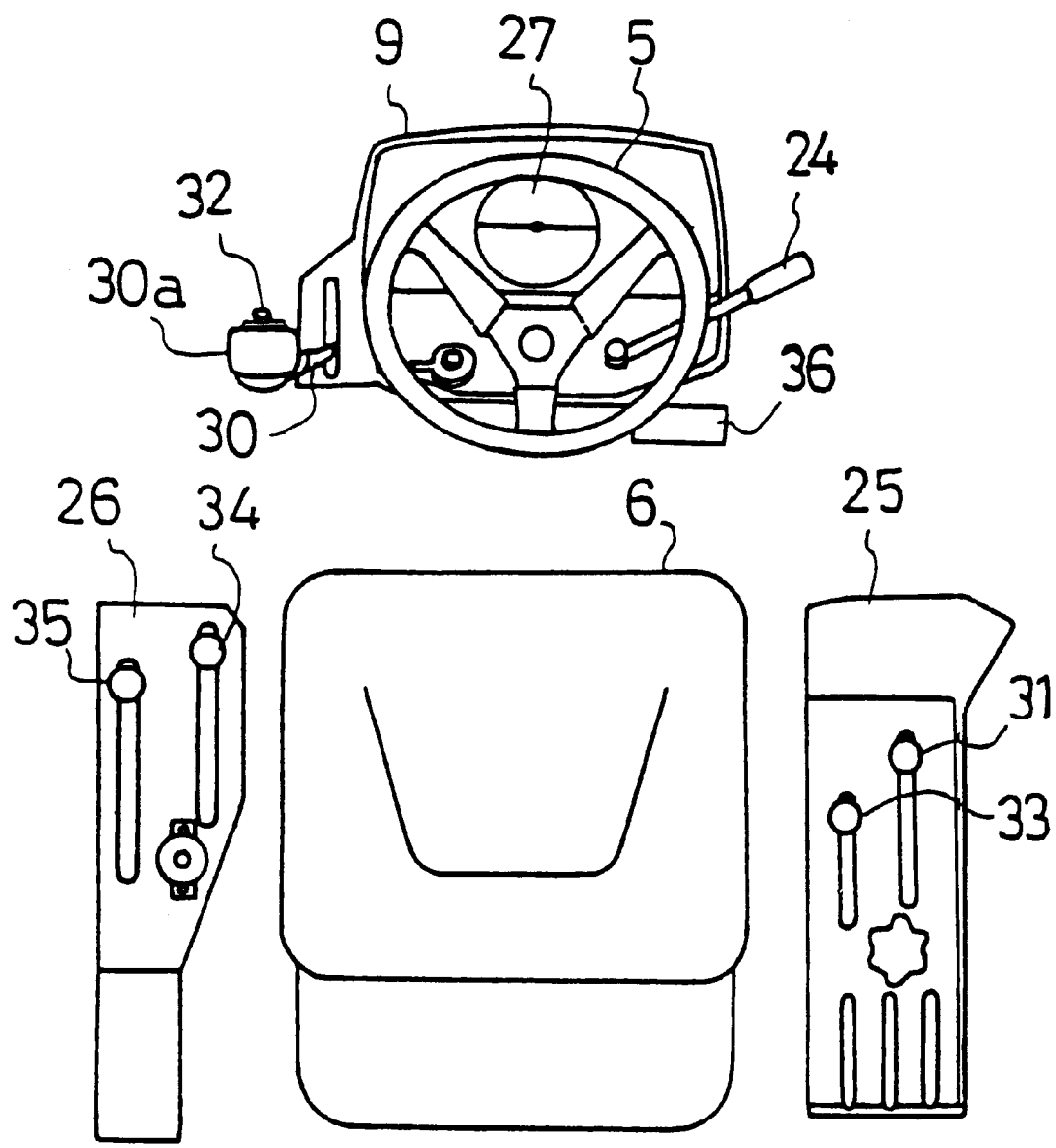
FIG. 3 is a plan view of an interior of a cabin constituting an operating portion.

As shown in FIG. 3, in operating portion C, a front column 9 is disposed at the rear of bonnet 2. Seat 6 is disposed behind front column 9. At the right side of seat 6 is disposed a right lever guide 25, which is provided with a position lever 31, a draft control lever 33 and the like.

At the left side of seat 6 is disposed a left lever guide 26, which is provided with PTO transmission levers 34 and 35 and the like. Round handle 5 projects from the upper surface of front column 9. On the upper surface of front column 9 is disposed a control panel 27 including a speed meter, a fuel gauge and the like. From the right side looking in the forward traveling direction of the upper surface of front column 9 projects an accelerator lever 24, and from the left side thereof projects a back-and-forth operating lever 30. Back-and-forth operating lever 30 is provided, at a grip 30a thereof, with a working machine vertically moving lever 32 and a sub-transmission switch 37.

Figure 4:
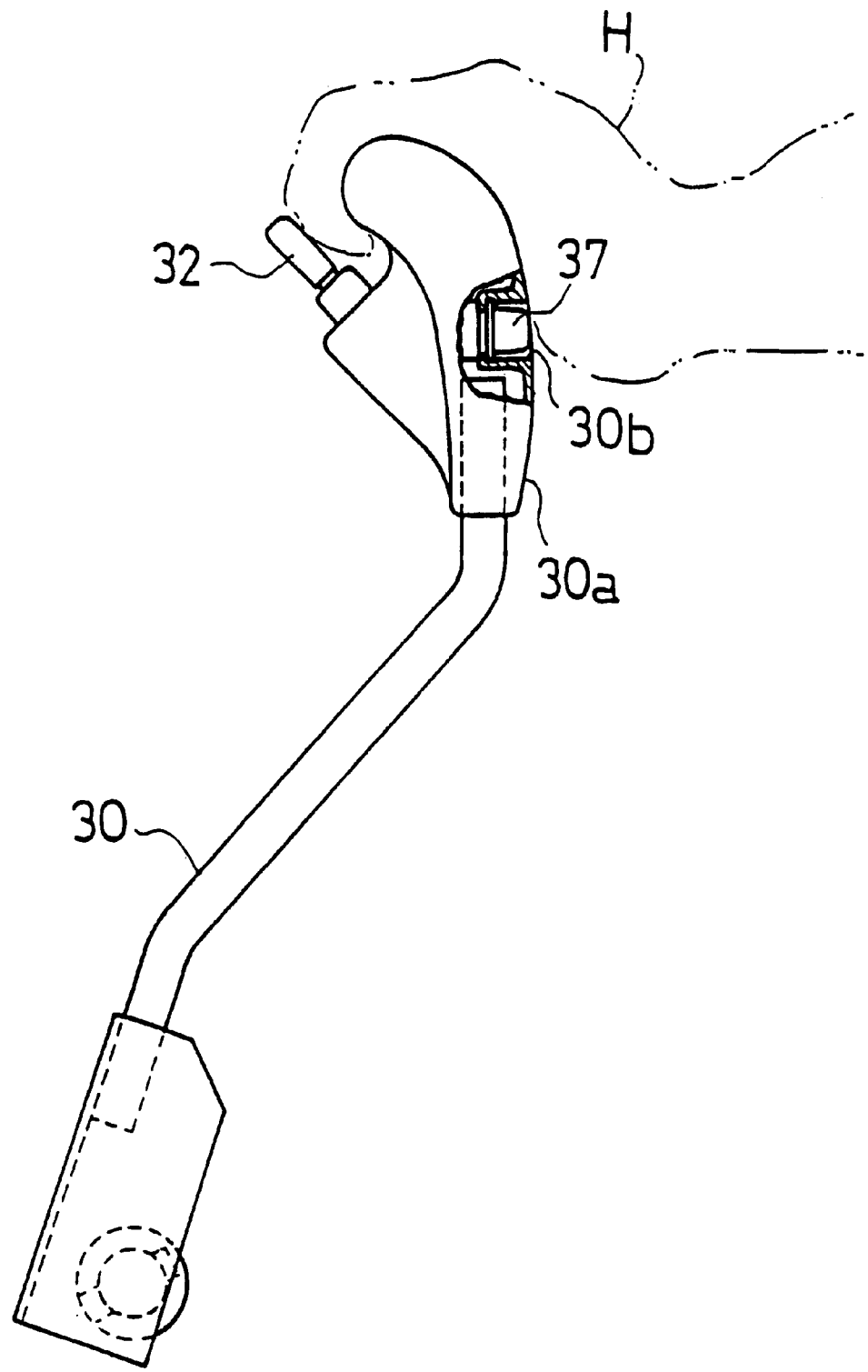
FIG. 4 is a side view of a back-and-forth operating lever.
Figure 5:
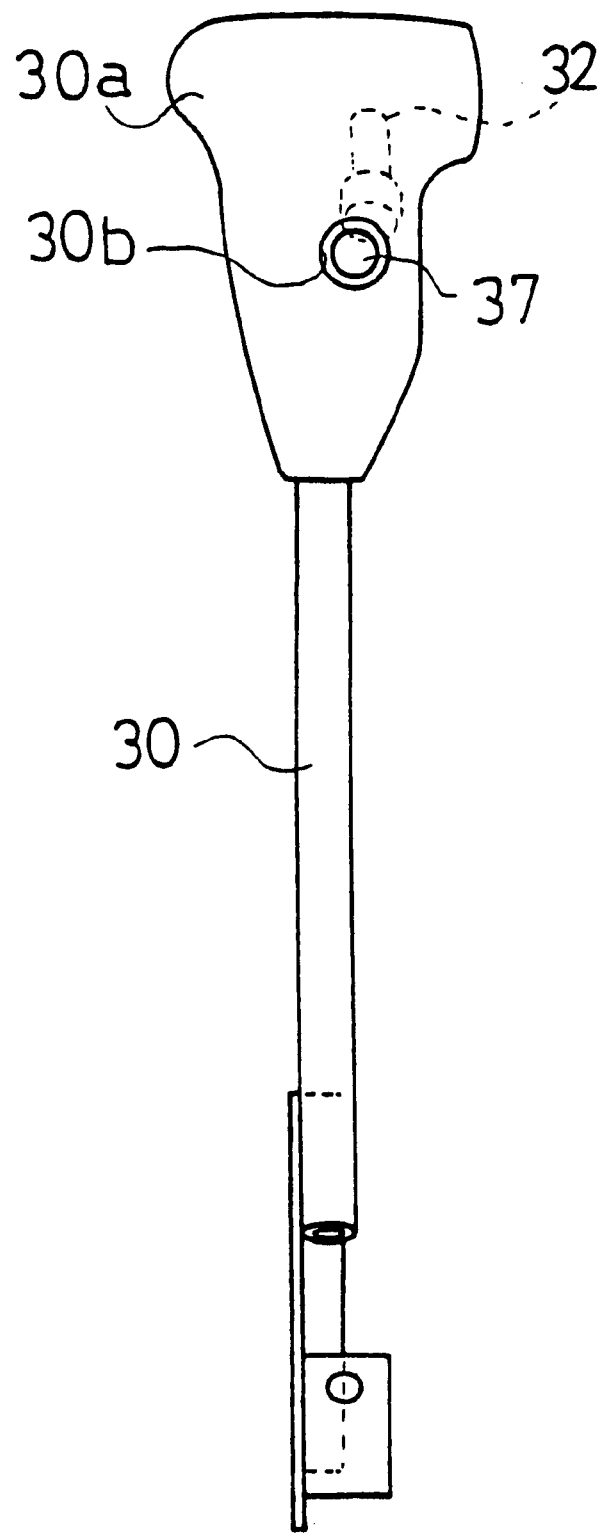
FIG. 5 is a rear view of the back-and-forth operating lever of FIG.4.

As shown in FIGS. 4 and 5, the lower portion of back-and-forth operating lever 30 provided with sub-transmission switch 37 constitutes a rotatable basic portion. The rotative portion thereof is connected with a means for changing angles of swash plates of the pair of hydraulic pumps P1 of the HST. Grip 30a, which is substantially T-like-shaped when viewed from the front, and formed at the upper portion of back-and-forth operating lever 30, has an upper surface fit for putting fingers of a hand H thereon, a front surface provided with working machine vertically moving lever 32 so as to be operated by a finger, and a rear surface fit for putting the palm of hand H thereon.

Also, in a recessed portion 30b formed at the rear surface of grip 30a is disposed sub-transmission switch 37. The utmost end of sub-transmission switch 37 is disposed so as not to project from the rear surface (the gripped surface) of grip 30a, such that sub-transmission switch 37 cannot be pushed when an operator merely grips grip 30a, but can be switched ON or OFF when thrust by his thumb.

Figure 6:
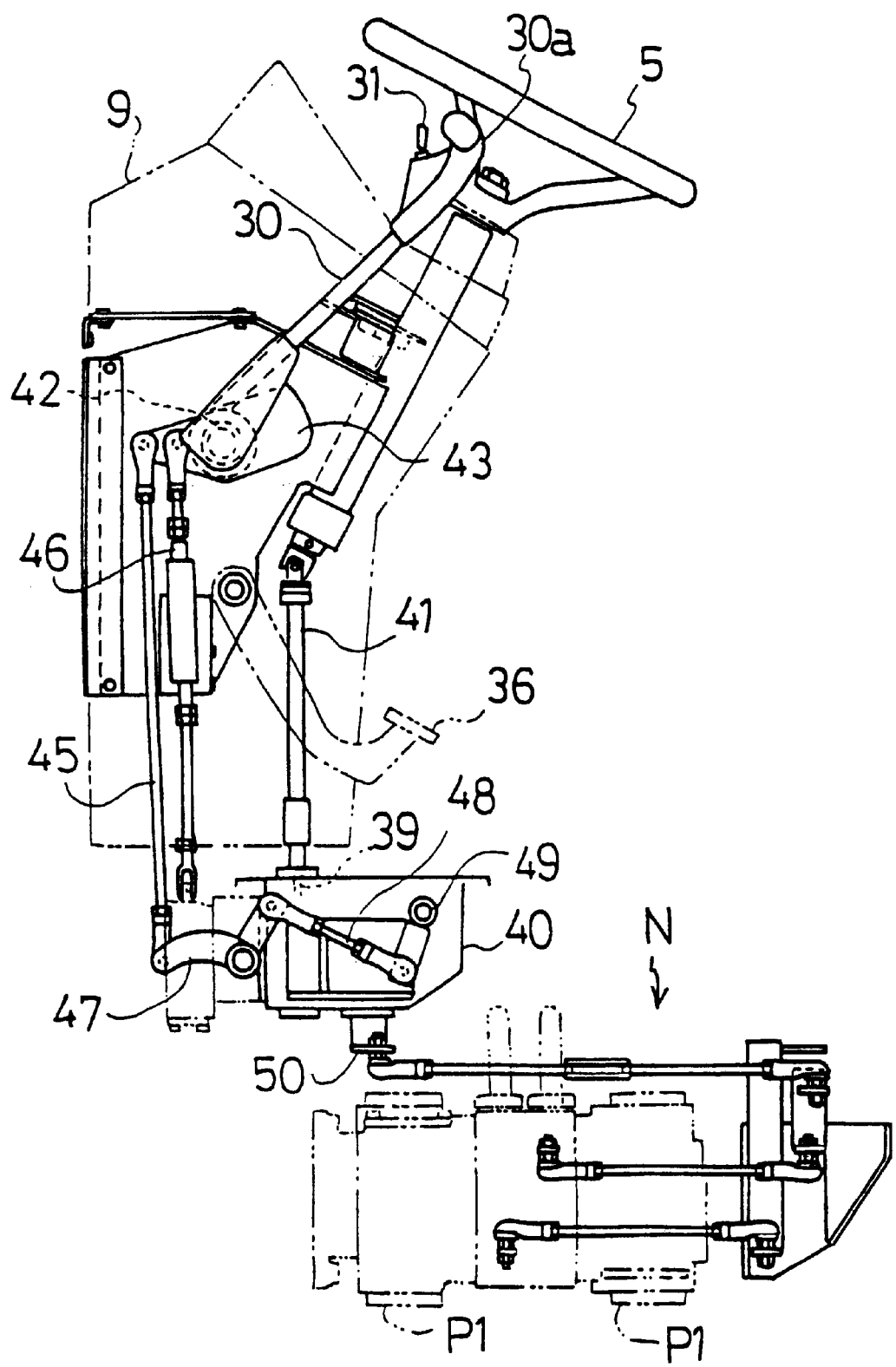
FIG. 6 is a side view of a steering-transmission and a main-transmission in a front column.
Figure 7:
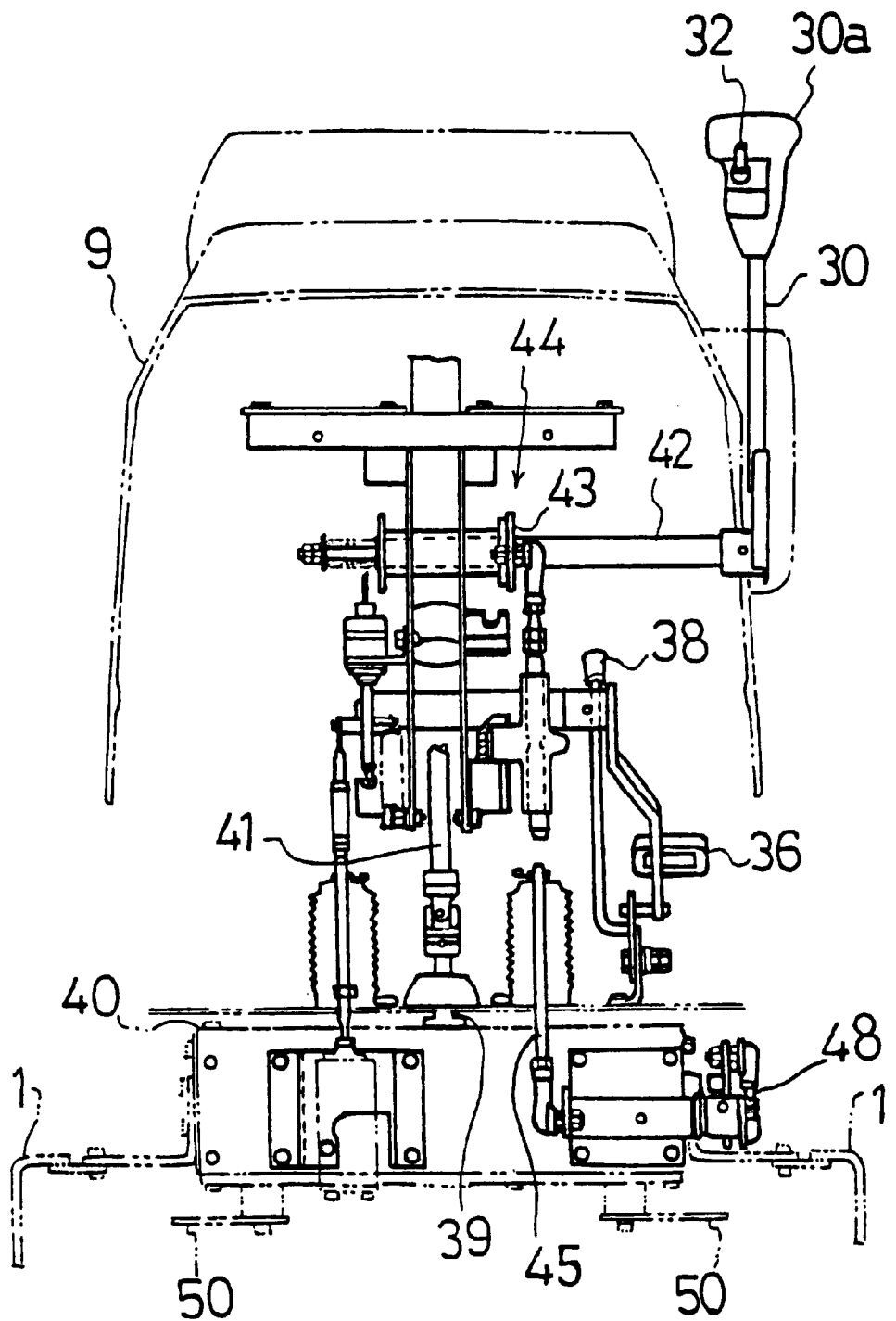
FIG. 7 is a front view of the steering-transmission and the main-transmission of FIG. 6.

Also, as shown in FIGS. 6 and 7, a brake pedal 36 and a lock lever 38 for locking it project from the lower rear portion of front column 9, and a steering box 40 is disposed between left and right body frames 1 under front column 9. Steering box 40 includes a transmitting linkage mechanism. A lower portion of the rotative shaft of handle 5 and one end of a link connected with back-and-forth operating lever 30 are inserted into the transmitting linkage mechanism, so that a steering operation can communicates with a transmitting operation.

The rotative shaft centering handle 5 is connected via transmission shaft 41 with a pinion shaft 39 projecting upwardly from the upper surface of steering box 40. On the other hand, the rotatable basic portion of back-and-forth operating lever 30 is fixed to a lever support shaft 42, and an acting arm 43 is fixed to an intermediate portion of of lever support shaft 42. Operating arm 43 is biased by pressure of a lever operating position holding means 44, so that back-and-forth operating lever 30 can be held at any position to which it is rotated. A connecting link 45 and a restricting rod 46 are connected with acting arm 43. A detent mechanism, which stops rotating restricting rod 46 at the neutral position thereof, and a mechanism restricting the limit positions of forward and backward rotation of restricting rod 46 connect with restricting rod 46.

Connecting link 45 is connected with a transmission shaft 49 of steering box 40 via an arm 47, a link 48 and the like. A pair of arms 50 project from the lower portion of steering box 40 and are connected with a trunnion shaft slanting the swash plates of hydraulic pumps P1 via a transmitting mechanism N comprising links, arms and the like. According to such a construction, the angles of slanting swash plates are both changed similarly by the transmitting linkage mechanism corresponding to the rotation of back-and-forth operating lever 30, so as to change the number of rotation of left and right hydraulic motors M, such that the main-transmission of forward and backward travel can be accomplished. Also, when handle 5 is rotated for steering, the rotation of inside hydraulic motor M in turning is decelerated for a normal turn or reversed for a spinning turn by the transmitting linkage mechanism in steering box 40 corresponding to the rotation of handle 5, so that the tractor can turn or spin.

Also, vertically moving means 4, which moves working machine B vertically, extends or contracts according to the rotation of position lever 31 or that of working machine vertically moving lever 32 on grip 30a of back-and-forth operating lever 30, which are disposed in operating portion C, or according to feedback from a draft sensor of working machine attaching device A or from a cultivating depth sensor of working machine B, so that working machine B can be moved vertically.

Figure 8:
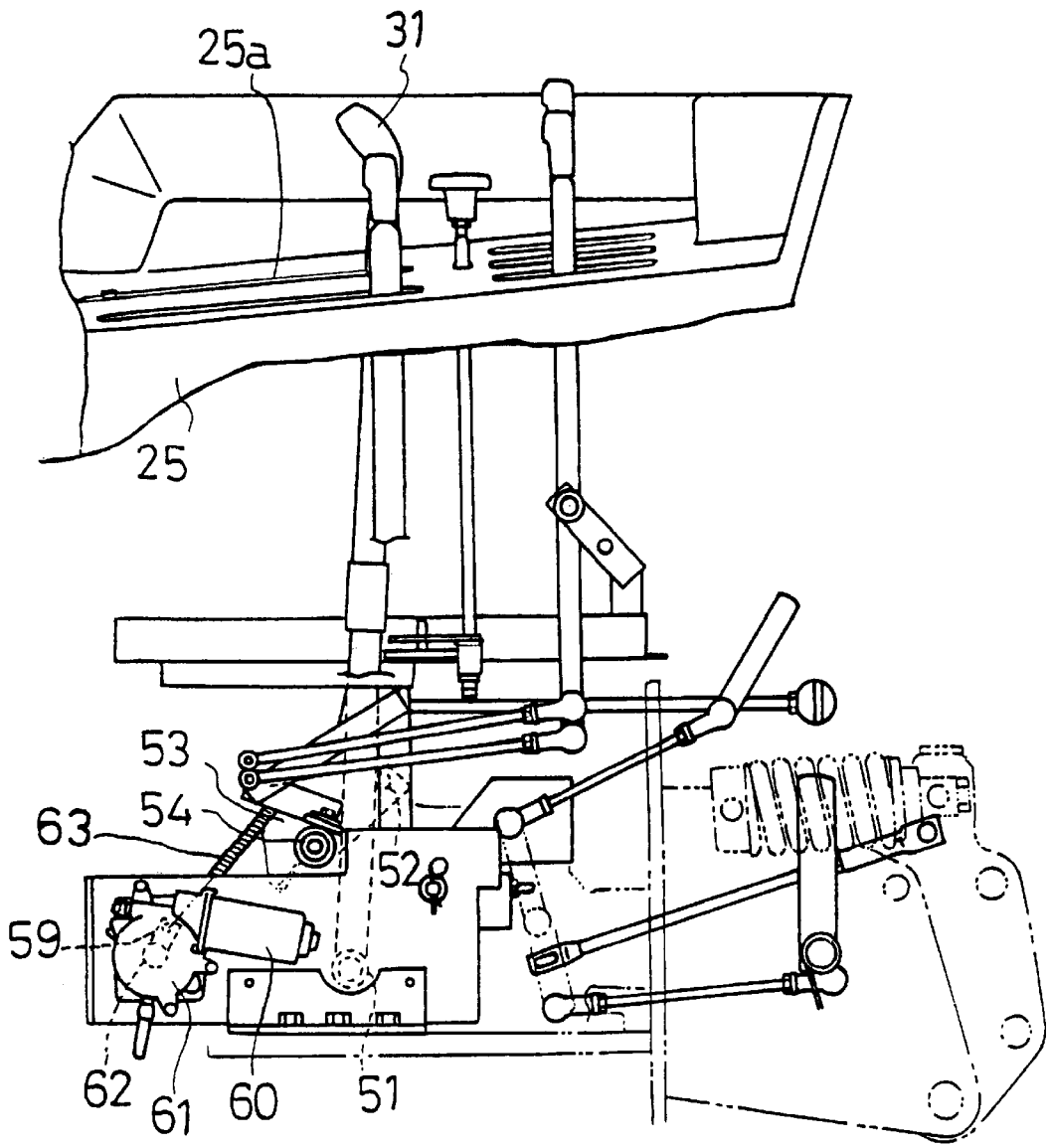
FIG. 8 is a side view of an attachment portion of a position lever.
Figure 9:
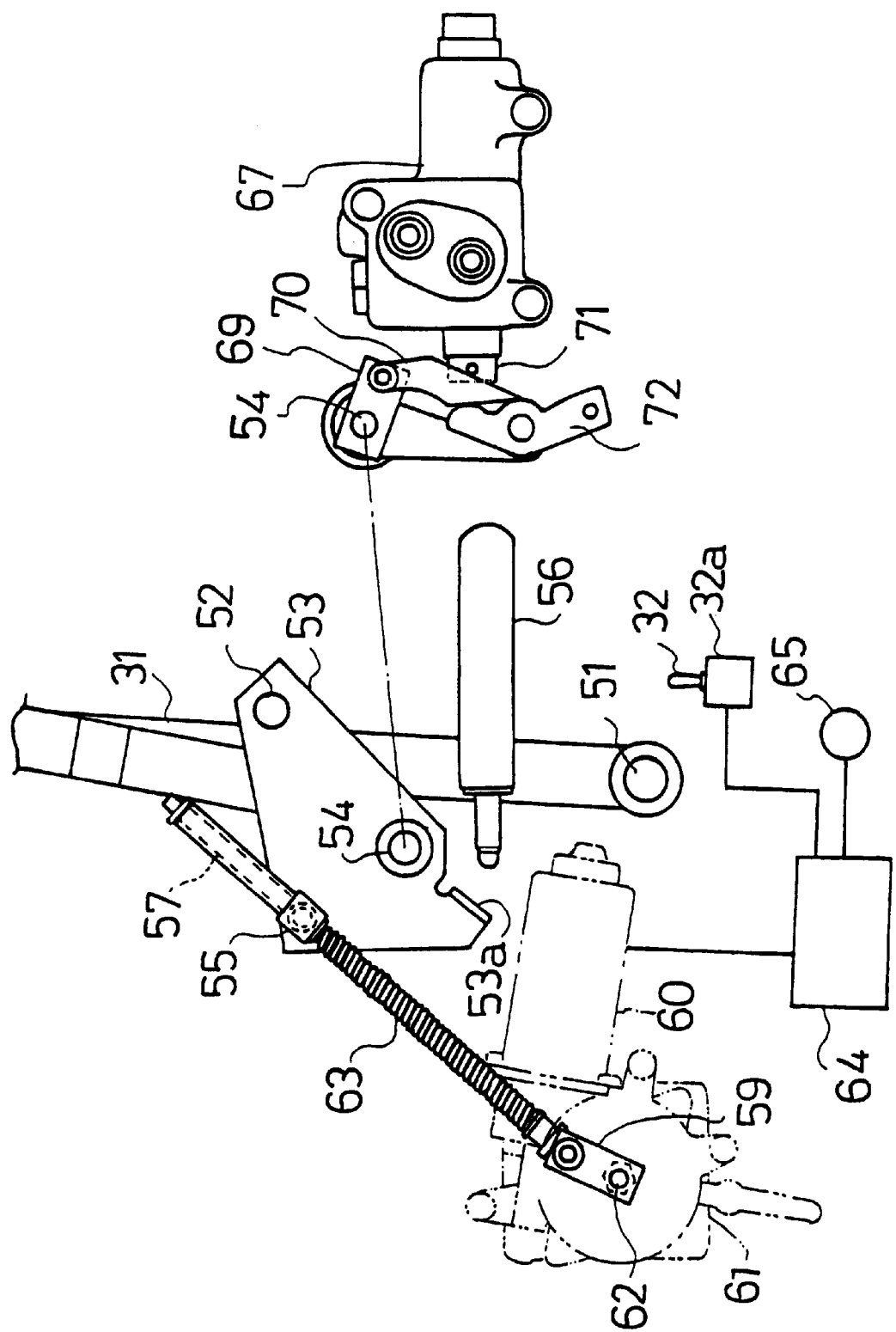
FIG. 9 is a side view of a driving portion of a vertical motion control valve and a block diagram of controlling thereof.

As shown in FIGS. 3, 8 and 9, position lever 31 is inserted into a guiding hole 25a of right lever guide 25. The lower end of position lever 31 is pivoted onto a shaft 51, and the intermediate portion thereof is engaged with a lever link 53 by engaging roller 52. The triangular plate of lever link 53 is fixed at the center thereof onto a support shaft 54, thereby being capable of rotating therearound, and pivotally supports engaging roller 52 at one apex portion thereof and a pivotal member 55 at another apex portion thereof, and forms an abutting portion 53a at the other apex portion thereof. Under lever link 53 is disposed a damper 56. Accordingly, when position lever 31 is rotated lowering lever link 53, abutting portion 53a abuts against damper 56, thereby cushioning against drastic lowering rotation of lever link 53.

A motor acting shaft 57 is slidably inserted at one end thereof into pivotal member 55 and is pivoted at the other end thereof to a rotary arm 59, which is fixed onto a driving shaft 62 projecting from a reduction gearbox 61. Reduction gearbox 61 is constructed integrally together with a motor 60, so as to reduce the rotational speed of rotary shaft of motor 60 for transmitting power. A spring 63 is wound around motor acting shaft 57 between the portion thereof pivoted to rotary arm 59 and pivotal member 55.

Motor 60, capable of being reversed, is connected with controller 64, so that the driving thereof is controlled by controller 64. A switch 32*a*, which is disposed at the rotatable basic portion of working machine vertically moving lever 32, and an operating knob 65 regulating sensitivity are connected with controller 64.

A control valve 67 for vertical motion of working machine B is disposed under seat 6. On the other hand, a cam 70 is pivotally connected with an arm 69 fixed onto support shaft 54. Cam 70 abuts against a spool 71 of control valve 67, and the lower portion of cam 70 abuts against an arm 72 connected with a feedback link for draft control. Motor 60 is driven according to pulse signals from controller 64. The pulse width can be adjusted by rotation of operating knob 65, so as to adjust the speed of lowering to be discussed below.

According to such construction, when working machine vertically moving lever 32 provided at back-and-forth operating lever 30 is in a raising operation, controller 64 pulses motor 60, so as to rotate rotary arm 59 toward the direction of upward motion, thereby pushing motor acting shaft 57 upward. Accordingly, lever link 53 and support shaft 54 are rotated, so that cam 70 is moved via arm 69, thereby sliding spool 71. As a result, control valve 67 is switched so as to contract the hydraulic cylinder constituting vertical motion means 4, such that working machine B is raised.

To the contrary, when working machine vertically moving lever 32 is in a lowering operation, motor 60 is pulsed by controller 64, so that cam 70 is moved and spool 71 slides toward the direction opposite to the above via rotary arm 59, motor acting shaft 57, lever link 53, support shaft 54 and arm 69, thereby extending vertical motion means 4, so as to lower working machine B. In this lowering, the pulse width or duty ratio is changed corresponding to the height of working machine B, so that working machine B is decelerated so as to be lowered gradually. When working machine vertically moving lever 32 is turned into a lowering operation, working machine B is lowered rapidly at first because of large pulse width for driving motor 60. From halfway of lowering, the pulse width becomes smaller gradually the more the working machine B approaches the field surface, so that the rotational speed of motor 60 becomes slower. Accordingly, working machine B is lowered slowly, so as to soften the shock of grounding. The pulse width can be changed by rotating operating knob 65, such that the lowering speed of working machine B is adjusted corresponding to its kind, weight and the like.

Furthermore, when position lever 31 is in a raising or lowering rotational operation, namely manual operation, motor acting shaft 57 keeps the same position thereof where motor acting shaft 57 has stopped according to stopping of motor 60 driven by operation of working machine vertically moving lever 32. Lever link 31 is rotated via engaging roller 52 according to rotation of position lever 31, thus, cam 70 is moved via support shaft 54 and arm 69, so as to slide spool 71, such that control valve 67 is switched so as to drive vertical motion means 4. During this operation, pivotal member 55 slides along motor acting shaft 57 against the bias of spring 63. Even if working machine B is controlled with the cultivating depth thereof, it can be moved vertically by operation of working machine vertically moving lever 32.

Accordingly, when the tractor is reversed, since traveling transmission and vertical motion can be done simultaneously by rotation of working machine vertically moving lever 32 disposed at back-and-forth operating lever 30, working machine B can be vertically moved rapidly.

Also, when heavy working machine B is lowered on starting of work after reversing the tractor, since the speed of lowering thereof is gradually slower the more it is lowered, so as to soften the shock of grounding thereof, working machine B does not cut into the field as deeply, so that the tractor with working machine B can start its work smoothly. The speed of decelerated lowering can be regulated easily according to change of setting of motor 60.

Furthermore, since it is constructed such that a manual operation has priority, when the tractor with working machine B is working in case that the cultivating depth of working machine B is set, working machine B can be vertically moved rapidly by manual operation and be returned to the prior setting.

Figure 10:
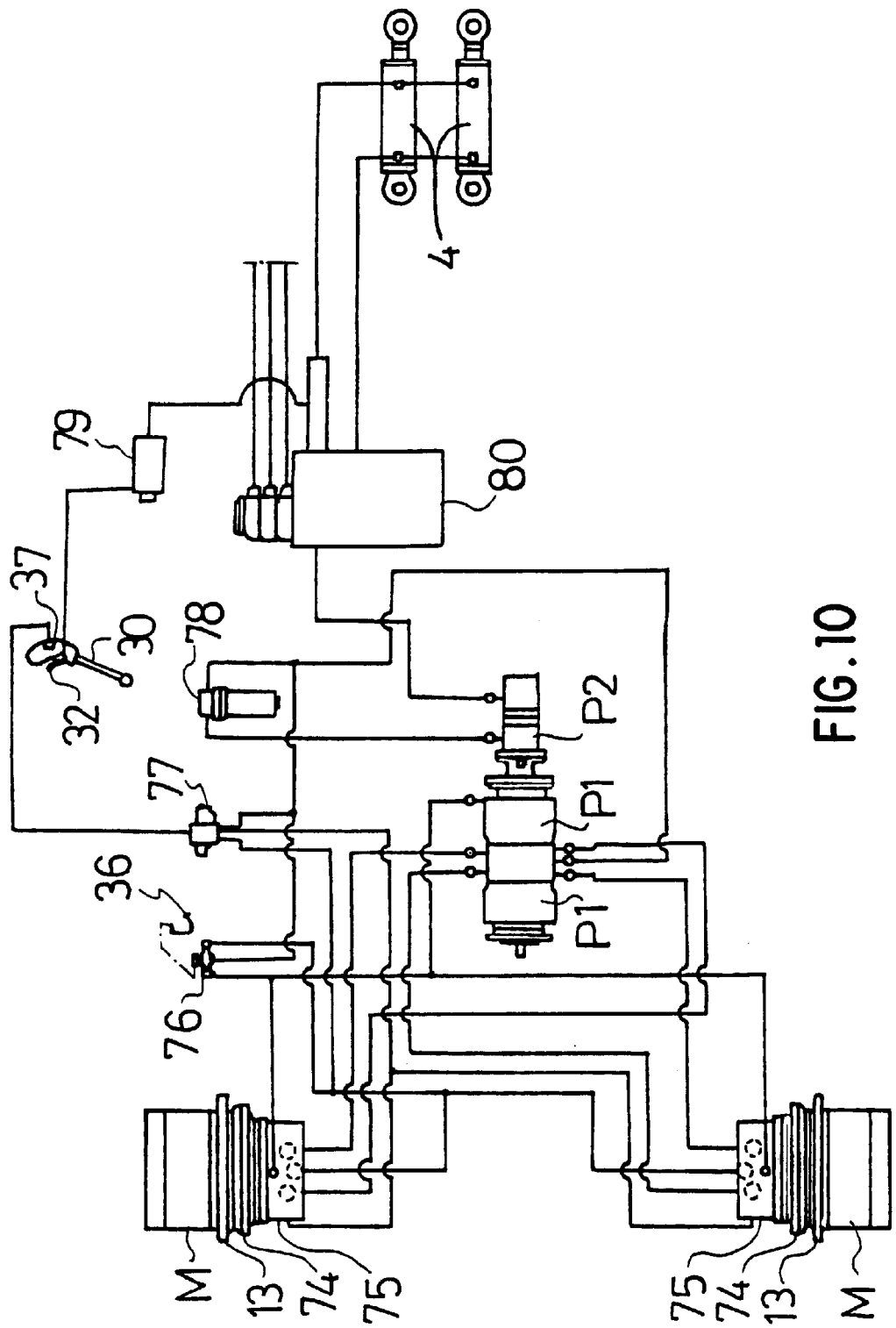
FIG. 10 is a hydraulic circuit diagram.

Next, explanation will be given on the hydraulic circuit as shown in FIG. 10. As mentioned above, at the rear of front transmission case 20 are disposed in a row the pair of hydraulic pumps P1 and hydraulic pump P2 for moving working machine and charging oil. Hydraulic pumps P1 are respectively connected with left and right hydraulic motors M, so as to construct two pairs of hydraulic closed circuit. According to change of the angles of swash plates of hydraulic pumps P1, the quantity of discharged operating oil can be changed steplessly and the direction thereof can be changed, so that both of a switching operation between forward and backward travel and a main-transmission can be done simultaneously. Also, according to respective change of quantities of operating oil discharged to left and right hydraulic motors M, the rotational speeds thereof can be changed respectively, thereby enabling the tractor to turn. The pair of sprockets 13 are fixedly disposed respectively on the output shafts of hydraulic motors M, so as to drive the pair of crawlers 17.

Also, each hydraulic motor M is integrally provided with a hydraulic servo brake 74 and a sub-transmission mechanism 75. Brake 74 can act according to switching of hydraulic brake valve 76 by tread of brake pedal 36, and can be released by starting of engine E so as to drive hydraulic pumps P1. Sub-transmission mechanism 75 can be changed between high and low speed states according to switching of a hydraulic transmission valve 77. Hydraulic transmission valve 77, which is an electromagnetic valve, is switched by sub-transmission switch 37. Reference numerals 78 and 80 respectively designate a hydraulic pilot pressure switching valve and a control valve. They are switched by operation of position lever 31 or working machine vertical moving lever 32, so as to extract and contract vertical motion means 4, or to supply oil to an extract hydraulic device. A reference numeral 79 designates a motor connected with working machine vertically moving lever 32. Motor 79 is driven by operation of working machine vertically moving lever 32, so as to shift a spool of control valve 80, extracting or contracting vertical motion means 4, such that working machine B can be vertically moved.

According to such construction, the speed of forward or backward travel can be steplessly changed according to shift of swash plates of hydraulic pumps P1 by operation of back-and-forth operating lever 30, and can be shifted to a high or low state according to act of the pair of sub-transmission mechanisms 75 by switching of hydraulic transmission valves 77 when sub-transmission switch 37 disposed at grip 30*a* of back-and-forth operating lever 30 is pushed. When sub-transmission switch 37 is pushed again, the traveling speed is shifted to the opposite state.

The traveling speed corresponding to the load at work can be regulated steplessly by operation of back-and-forth operating lever 30, and simultaneously sub-transmission operation can be done easily only by moving of a finger without change of lever, so that the changing between high and low speed states can be done steadily and smoothly. Even if the traveling speed at work has been changed by operation of sub-transmission switch 37, it can be returned to that set by back-and-forth operating lever 30 easily by once more pushing sub-transmission switch 37.

Furthermore, since sub-transmission switch 37 is disposed in the recessed portion 30b of grip 30a, it is not operated by gripping back-and-forth operating lever 30, but operated by thrust of the utmost end of sub-transmission switch 37, thereby enabling sub-transmission switch 37 to be prevented from erroneous operation when back-and-forth operating lever 30 is operated, such that the main-transmission and the sub-transmission can be separately done steadily.

According to the above mentioned features, the operating device for a working vehicle of the present invention is useful in a traveling vehicle with a working machine attached thereto, for example, an agricultural working vehicle like a tractor, a combine and so on, or a construction machinery like a back-hoe, a bulldozer, a truck and so on, which enables a working machine vertically moving operation by hydraulic cylinder, a back-and-forth traveling operation, left-and-right turning operation and the like to be done by an operation sitting on the seat thereof.

What is claimed is:

1. An operating device for a working vehicle comprising:
    a back-and-forth operating lever disposed near a seat;
    a working machine vertically moving lever provided at a grip of said back-and-forth operating lever;
    a position lever disposed at a side of said seat; and
    a vertical motion control device, which is so constructed that said back-and-forth operating lever, said working machine vertically moving lever, and said position lever are interlocked with a spool of a vertical motion control valve, wherein said working machine vertically moving lever is interlocked with said spool via a motor, so as to gradually decelerate said motor in a lowering operation of said working machine vertically moving lever.

2. An operating device for a working vehicle as set forth in claim 1, wherein the operation of said position lever has priority.

3. An operating device for a working vehicle as set forth in claim 1, further comprising:
    a recessed portion formed at the position of said grip contacting with a palm of an operator; and
    a sub-transmission switch disposed in said recessed portion for controlling a sub-transmission, wherein an utmost end of said sub-transmission switch does not project from the gripped surface of said grip.

4. An operating device for a working vehicle comprising:
    a hydrostatic transmission (HST) for connecting a hydraulic pump driven by an engine with a hydraulic motor driving a traveling device via a hydraulic closed circuit;
    a sub-transmission for changing a speed ratio of said hydraulic motor;
    a back-and-forth operating lever disposed near a seat for changing a traveling speed of the working vehicle by controlling the speed of the hydraulic motor; and
    a sub-transmission switch disposed at a grip of said back-and-forth operating lever, whereby a change in speed of the working vehicle can be implemented in a steady manner by single-handed operation of said back-and-forth lever and said sub-transmission switch.

5. An operating device for a working vehicle including a working device, comprising:
    a back-and-forth operating lever for controlling a travel speed of the working vehicle, said back-and-forth operating lever including a grip provided thereon;
    a working machine vertically moving lever for raising and lowering the working device being disposed at said grip of said back-and-forth operating lever;
    a position lever for adjusting a working height of the working device; and
    a vertical motion control device for controlling vertical motion of said working device effected by actuation of said working machine vertically moving lever, said vertical motion control device operating to gradually decelerate vertical movement of said working device during at least a portion of a lowering operation thereof.

6. An operating device according to claim 5, wherein said vertical motion control device includes a controller for generating pulse signals in response to actuation of said working machine vertically moving lever, a motor driven in accordance with said pulse signals, a cam operated by rotation of said motor, and a control valve having a spool movable by operation of said cam, one of a pulse width and a duty ratio being changed dependent upon a height of said working device thereby changing a rotational speed of said motor.

7. An operating device according to claim 6, wherein said spool is moved in response to actuation of said position lever.

8. An operating device according to claim 5, further comprising:
    a sub-transmission;
    a recessed portion formed at a position of said grip corresponding to a gripped surface contacted by a palm of an operator during use; and
    a sub-transmission switch disposed in said recessed portion for controlling the sub-transmission, an utmost end of said sub-transmission switch being oriented so as not to project beyond the gripped surface of said grip.

9. An operating device according to claim 5, wherein operation of said position lever has priority over other systems present for effecting a change in height of said working device.

* * * * *